United States Patent
Hata et al.

(10) Patent No.: US 6,775,513 B2
(45) Date of Patent: Aug. 10, 2004

(54) IMAGE FORMING APPARATUS HAVING REMOVABLE ANGLE STOPPER

(75) Inventors: Kiyoshi Hata, Hachioji (JP); Tsuyoshi Mizubata, Hachioji (JP); Masashi Aoki, Hachioji (JP); Nobutaka Kato, Higashikurume (JP); Osamu Kato, Higashimurayama (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/233,948

(22) Filed: Sep. 3, 2002

(65) Prior Publication Data

US 2003/0049061 A1 Mar. 13, 2003

(30) Foreign Application Priority Data

Sep. 10, 2001 (JP) .......................................... 2001-273024

(51) Int. Cl.⁷ .............................................. G03G 15/00
(52) U.S. Cl. .......................................... 399/367; 355/75
(58) Field of Search ................................. 399/367, 365, 399/379, 380; 355/25, 75; 16/82; 292/343, DIG. 17

(56) References Cited

U.S. PATENT DOCUMENTS

| | | | | |
|---|---|---|---|---|
| 4,128,334 A | * | 12/1978 | Yanagawa et al. | ............. 355/75 |
| 4,853,750 A | * | 8/1989 | Murata et al. | ................. 355/75 |
| 5,060,018 A | * | 10/1991 | Watanabe | .................... 399/379 |
| 6,256,473 B1 | * | 7/2001 | Kamanuma et al. | ......... 399/367 |
| 6,321,063 B1 | * | 11/2001 | Tanaka et al. | ............... 399/367 |
| 6,324,362 B1 | * | 11/2001 | Yokoyama et al. | .......... 399/367 |
| 6,351,624 B1 | * | 2/2002 | Hiruta | ......................... 399/380 |
| 6,456,365 B1 | * | 9/2002 | Hosaka et al. | ................. 355/75 |

FOREIGN PATENT DOCUMENTS

| | | | | |
|---|---|---|---|---|
| JP | 57147667 A | * | 9/1982 |
| JP | 60091346 A | * | 5/1985 |
| SU | 1224051 A | * | 4/1986 |

* cited by examiner

Primary Examiner—Arthur T. Grimley
Assistant Examiner—Ryan Gleitz
(74) Attorney, Agent, or Firm—Muserlian, Lucas and Mercanti

(57) ABSTRACT

An image forming apparatus includes an image reading unit, document convey unit, display/operating portion, and hinge. The image reading unit has a slit glass plate for conveying and scanning a document, and a platen glass plate for fixing and scanning the document. The document convey unit is set above glass surfaces of the slit glass plate and platen glass plate. The display/operating portion is provided to one side of the glass surfaces. The hinge is provided to the other side of the glass plates and serves to attach the document convey unit to be openable and closeable with respect to the glass surfaces. The hinge has an angle stopper with which the document convey unit can be opened at one desired open angle selected from at least two different open angles with respect to the glass surfaces.

2 Claims, 6 Drawing Sheets

IMAGE FORMING APPARATUS HAVING REMOVABLE ANGLE STOPPER

BACKGROUND OF THE INVENTION

1. Field of the Invention

The present invention relates to an image forming apparatus such as an electrophotographic copying apparatus, a printer, a facsimile apparatus, a composite machine having a plurality of functions including those of the electrophotographic copying apparatus, printer, and facsimile apparatus, a printing machine, or the like, and more particularly, to an image forming apparatus which has a document convey unit for conveying a document and an image reading unit for reading a document image in order to form an image.

2. Description of the Prior Art

Conventionally, an image reading unit in a digital image forming apparatus has a slit glass plate for conveying and scanning a document, and a platen glass plate for fixing and scanning the document. A document convey unit is set above the glass surfaces of the slit glass plate and platen glass plate, and separates and conveys the documents stacked on a feed tray one by one, so the image reading unit can read a document image.

In this image forming apparatus, the document convey unit can be opened and closed with respect to the glass surfaces. Sometimes the document convey unit is kept open, and a document is placed on the glass surface of the platen glass plate, so the document image is read by the image reading unit. In this case, the document convey unit is opened excessively widely for a physically handicapped user such as a wheelchair user. Hence, the user cannot operate the image forming apparatus.

SUMMARY OF THE INVENTION

The present invention has been made to solve the above inconvenience of the conventional image forming apparatus, and has as its object to provide an image forming apparatus in which the user can select an appropriate open angle of the document convey unit without changing any component.

In order to achieve the above object, according to the main aspect of the present invention, there is provided an image forming apparatus comprising an image reading unit having a slit glass plate for conveying and scanning a document and a platen glass plate for fixing and scanning the document, a document convey unit set above glass surfaces of the slit glass plate and platen glass plate, a display/operating portion provided to one side of the glass surfaces, and a hinge provided to the other side of the glass plates and serving to attach the document convey unit to be openable and closeable with respect to the glass surfaces, wherein the hinge has an angle stopper with which the document convey unit can be opened at one desired open angle selected from at least two different open angles with respect to the glass surfaces.

With the image forming apparatus according to the main aspect, an angle stopper is provided so the document convey unit can be opened from the glass surfaces by selecting one among two or more different open angles. When the document convey unit is opened excessively wide at an ordinary open angle and thus difficult to operate for, e.g., a physically handicapped user such as a wheelchair user, the open angle can be easily changed to a narrow open angle.

According to the second aspect of the present invention, the angle stopper of the image forming apparatus according to the main aspect can change the open angle of the document convey unit with respect to the glass surfaces by changing an attaching position (attaching direction) where the angle stopper is attached to the hinge.

With the image forming apparatus according to the second aspect, the open angle of the document convey unit with respect to the glass surfaces can be changed by changing the attaching direction of the angle stopper. Hence, the change in open angle of the document convey unit with respect to the glass surfaces can be achieved easily without changing any component.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

An image forming apparatus according to one embodiment of the present invention will be described with reference to the accompanying drawings. It should be noted that the present invention is not limited to this embodiment.

Figure 1:
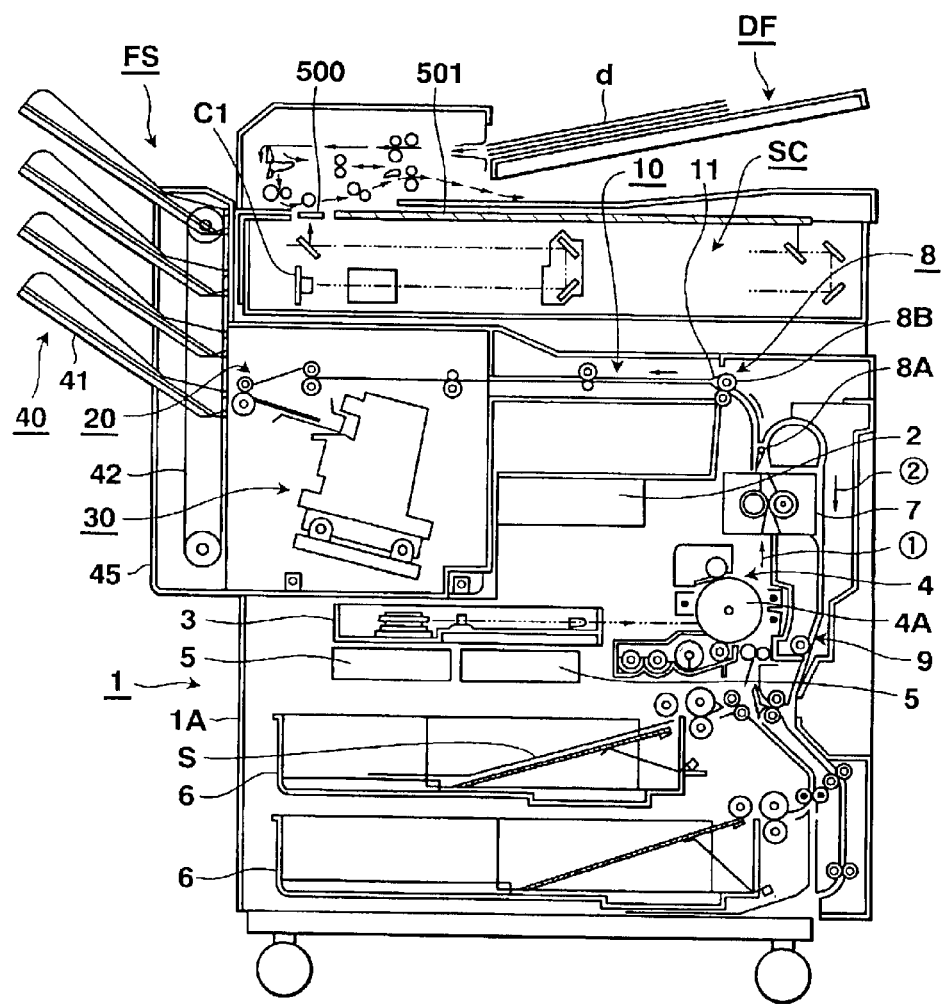
FIG. 1 is an open front view showing the overall arrangement of an image forming apparatus having a document convey unit, image reading unit, and sheet postprocessing unit.

FIG. 1 is an open front view showing the overall arrangement of an image forming apparatus 1 having a sheet postprocessing unit FS, document convey unit DF, and image reading unit (scanner) SC.

Referring to FIG. 1, an image forming apparatus main body 1A has an image processing section 2, image writing section 3, image forming section 4, high-voltage power supplies 5, cassette feeders 6, fixing device 7, delivery section 8, and re-convey means (ADU) 9 for automatic double-side copying.

The image reading unit SC and document convey unit DF are mounted on the upper portion of the image forming apparatus main body 1A. The sheet postprocessing unit FS connected to the delivery section 8 is mounted on the upper left of FIG. 1 that shows the image forming apparatus main body 1A.

The image reading unit SC has a slit glass plate 500 for conveying and scanning a document, and a platen glass plate 501 for stationarily scanning the document. The document convey unit DF is set above the glass surfaces of the slit glass plate 500 and platen glass plate 501.

A document d placed on the document table of the document convey unit DF with its first surface facing up is conveyed in the direction of arrows, and the image of one or two surfaces of the document d is read by the optical system of the image reading unit SC and stored in a CCD image sensor C1.

An analog signal obtained by the CCD image sensor C1 through photoelectric conversion is subjected to an analog process, A/D conversion, shading correction, image compression, and the like by the image processing section 2, and is then sent to the image writing section 3.

In the image writing section 3, an output light beam from a semiconductor laser irradiates a photosensitive drum 4A of the image forming section 4 to form a latent image. The image forming section 4 performs processes such as charging, exposure, development, transfer, separation, cleaning, and the like, so the image is transferred onto a sheet S conveyed from each cassette feeder 6. The sheet S bearing the image is fixed by the fixing device 7, and is sent from the delivery section 8 to the sheet postprocessing unit FS. Alternatively, a sheet S, which has been subjected to a one-side image process and sent to the re-convey means 9 by the operation of a delivery path switching plate 8A, is subjected to a double-side image process by the image forming section 4 again, and is sent to the sheet postprocessing unit FS by delivery rollers 8B of the delivery section 8.

The sheet postprocessing unit FS is detachably mounted on the upper left of the image forming apparatus main body 1A. The sheet postprocessing unit FS is formed of a sheet convey means 10, delivery means 20, postprocessing means 30, and vertically movable delivery means 40, which are arranged in a sheet postprocessing unit main body 45.

Referring to FIG. 1, at that portion in the image forming apparatus main body 1A which is close to the right side, the cassette feeders 6, and the fixing device 7 and delivery section 8 are provided below and above the image forming section 4 as the center, respectively, in the direction of the height of the image forming apparatus main body 1A. This vertical arrangement forms a substantially vertical sheet convey path ①. The sheets S sent from the cassette feeders 6 are conveyed along the vertical sheet convey path ① above the cassette feeders 6, and are delivered outside the image forming apparatus main body 1A through the delivery section 8.

A sheet convey path ②, along which the sheets are conveyed by the re-convey means 9, is formed to be substantially parallel to the vertical sheet convey path ①.

When the vertical sheet convey paths ① and ② are formed, a sheet convey path from the cassette feeders 6 to the delivery section 8 is formed with the minimum distance.

The sheet convey means 10 of the sheet postprocessing unit FS is stored in an upper space of FIG. 1 that shows the image forming apparatus main body 1A. A sheet inlet 11 of the sheet convey means 10 is connected to the delivery rollers 8B of the delivery section 8 of the image forming apparatus main body 1A. In this mounting state, the delivery means 20 and postprocessing means 30 of the sheet postprocessing unit FS are stored in an upper left space of FIG. 1 that shows the image forming apparatus main body 1A. The vertically movable delivery means 40 formed of a plurality of delivery sheet trays (called bins as well) 41 and a vertically movable driving means 42 is located on the left side of the postprocessing means 30 in FIG. 1.

The open angle of the document convey unit DF with respect to the glass surfaces will be described with reference to FIGS. 2 to 6C.

Figure 2:
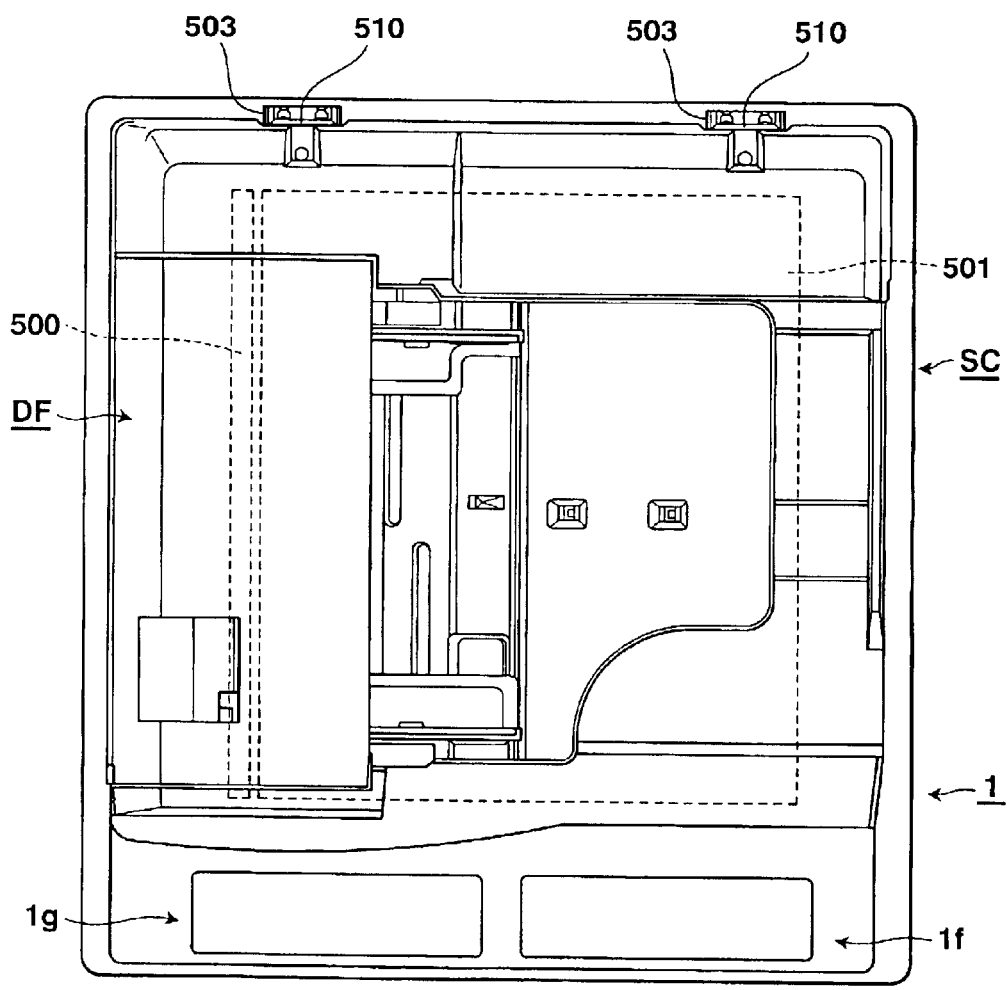
FIG. 2 is a plan view of the document convey unit.
Figure 3:
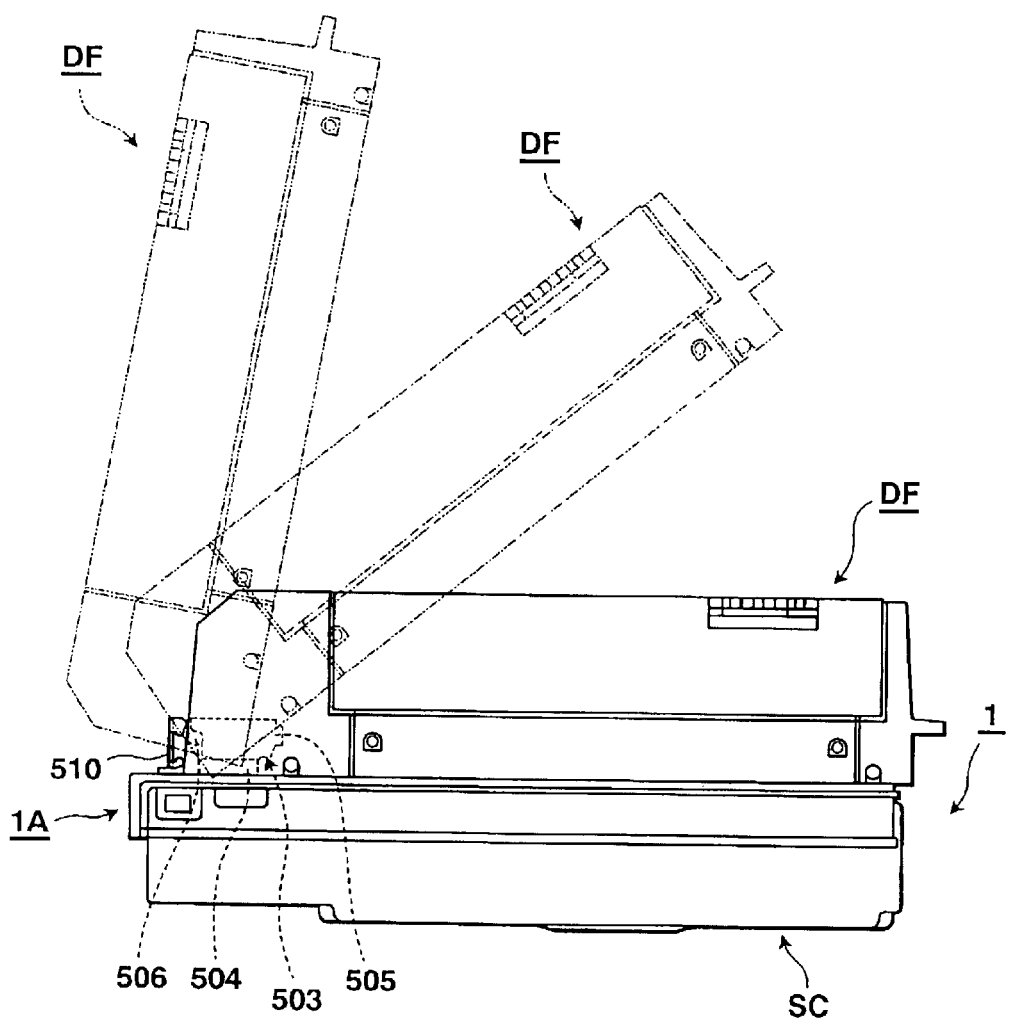
FIG. 3 is a side view showing an open state of the document convey unit.
Figure 4:
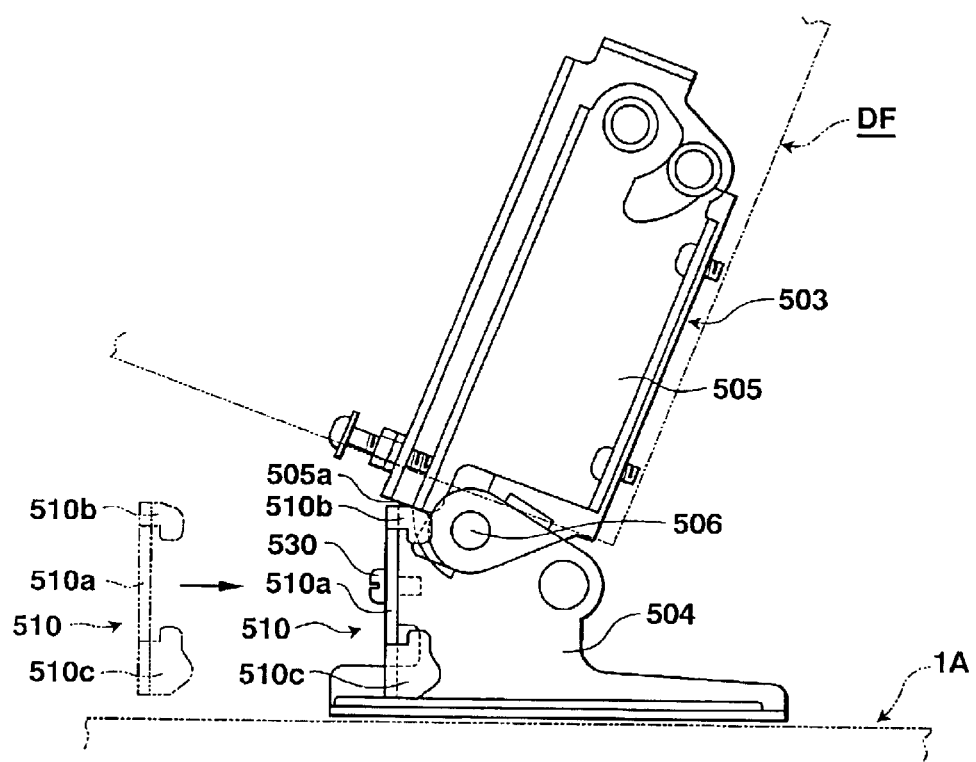
FIG. 4 is a partial enlarged side view showing a hinge at the first open angle and an angle stopper.
Figure 5:
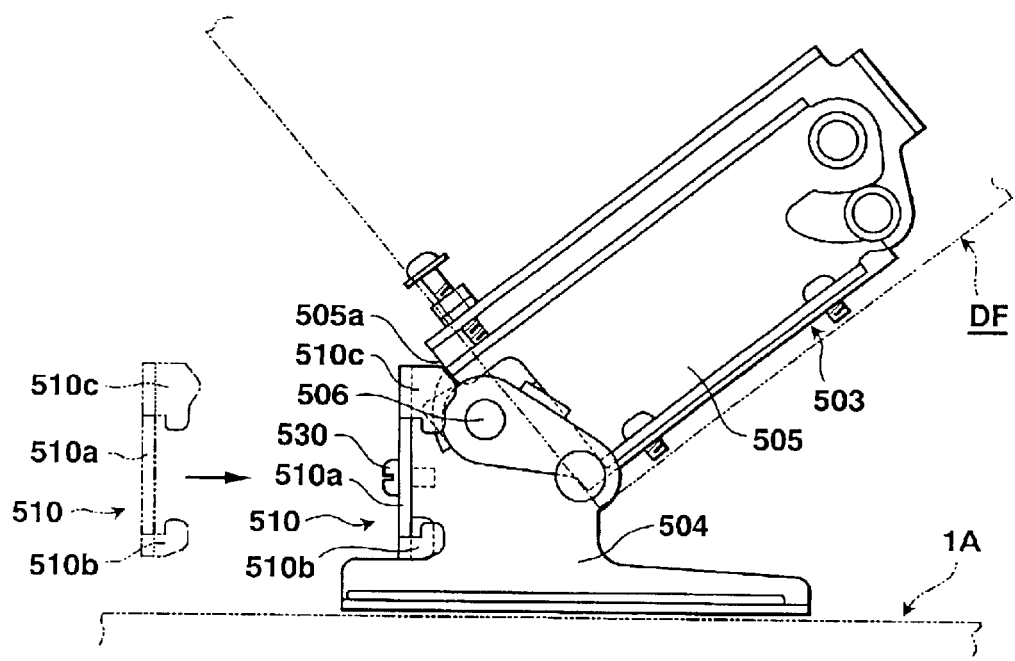
FIG. 5 is a partial enlarged side view showing the hinge at the second open angle and the angle stopper.
Figure 6A:
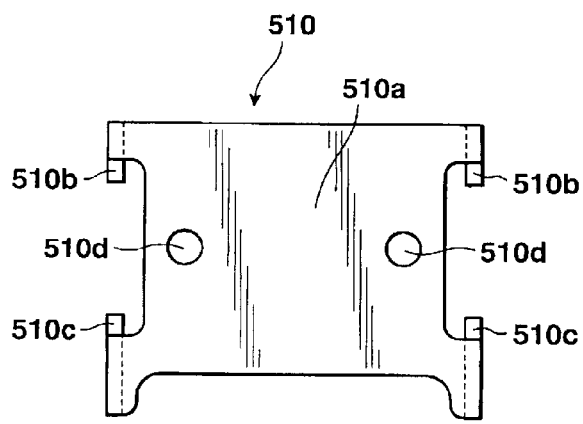
FIGS. 6A, 6B, and 6C are a plan view, an elevation, and a side view, respectively, of the angle stopper.
Figure 6B:
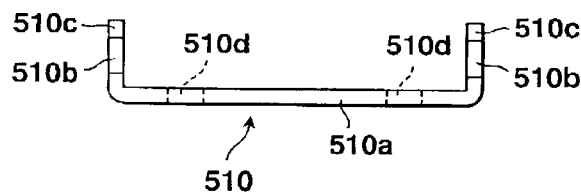
Figure 6C:
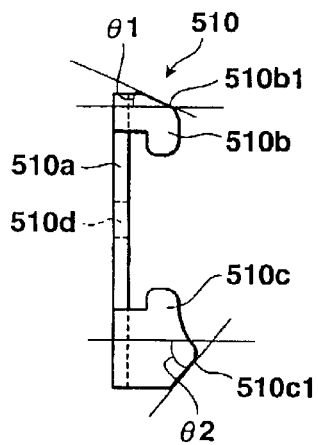

FIG. 2 is an upper plan view of the document convey unit, FIG. 3 is a side view showing an open state of the document convey unit, FIG. 4 is a partial side view showing a hinge at the first open angle and an angle stopper, FIG. 5 is a partial side view showing the hinge at the second open angle and the angle stopper, and FIGS. 6A, 6B, and 6C are a plan view, an elevation, and a side view, respectively, of the angle stopper.

The image forming apparatus 1 has, above the image forming apparatus main body 1A, an operating portion 1f and display portion 1g on one side of the glass surfaces of the slit glass plate 500 and platen glass plate 501, and hinges 503, which can open and close the document convey unit DF with respect to the glass surfaces, on the other side of the glass surfaces. One hinge 503 is fixed to the document convey unit DF, and the other hinge 503 is fixed to the image forming apparatus main body 1A.

The operating portion 1f and display portion 1g are arranged before the image forming apparatus 1 when seen from the user position with respect to the image forming apparatus 1, and the hinges 503 are arranged deep inside the image forming apparatus 1. When the user pivots the document convey unit DF about the hinges 503 as the fulcrum, the document convey unit DF is opened and closed with respect to the glass surfaces.

In each hinge 503, as shown in FIGS. 4 and 5, a stationary member 504 and movable member 505 are connected to each other through a support shaft 506. The stationary member 504 of the hinge 503 is attached to the image forming apparatus main body 1A, and the movable member 505 is attached to the document convey unit DF. Thus, the document convey unit DF can be opened or closed through the support shaft 506 as the fulcrum.

An angle stopper 510 is attached to the stationary member 504 of the hinge 503. As shown in FIGS. 6A to 6C, the angle stopper 510 is monolithically formed of sheet metal and has an attaching portion 510a, first stopper portions 510b, and second stopper portions 510c. Attaching holes 510d are formed in the attaching portion 510a.

Each first stopper portion 510b has a stopper surface 510b1. Each second stopper portion 510c has a stopper surface 510c1. A slant angle θ1 of the stopper surface 510b1 with respect to a plane perpendicular to an attaching surface 510a1 of the attaching portion 510a is set smaller than a slant angle θ2 of the stopper surface 510c1 with respect to a plane perpendicular to the attaching surface 510a1 of the attaching portion 510a.

As shown in FIG. 4, the angle stoppers 510 are placed against the stationary members 504 of the hinges 503 such that their first stopper portions 510b are located on the upper side, and are threadably attached to the stationary members 504 by inserting machine screws 530 in the attaching holes 510d. Thus, the angle stoppers 510 are fastened and fixed to the hinges 503. With this attaching state of the angle stoppers 510, when the document convey unit DF is opened through the fulcrum (506) of the hinges 503, ends 505a of the movable members 505 abut against the stopper surfaces 510b1 of the first stopper portions 510b, and the document convey unit DF is open widely. This is the first open position.

As shown in FIG. 5, the angle stoppers 510 are placed against the stationary members 504 of the hinges 503 such that their first stopper portions 510c are located on the upper side, and are threadably attached to the stationary members 504 by inserting the machine screws 530 in the attaching holes 510d. Thus, the angle stoppers 510 are fastened and fixed to the hinges 503. With this attaching state of the angle stoppers 510, when the document convey unit DF is opened through the fulcrum (506) of the hinges 503, the ends 505*a* of the movable members 505 abut against the stopper surfaces 510*c*1 of the second stopper portions 510*c*, and the document convey unit DF is open narrow. This is the second open position.

In this manner, the angle stoppers 510 are provided with which the document convey unit DF can be opened at one desired open angle selected from two open angles with respect to the glass surfaces. When the document convey unit DF is opened excessively wide at an ordinary open angle and thus difficult to operate for, e.g., a physically handicapped user such as a wheelchair user, the open angle can be easily changed to a narrow open angle.

When the attaching directions of the angle stoppers 510 are changed, the open angle of the document convey unit DF can be changed. Hence, change of the open angle of the document convey unit DF can be achieved easily without changing any component.

In this embodiment, each angle stopper 510 has two stopper portions, i.e., the first stopper portion 510*b* and second stopper portion 510*c*, but may have more than two stopper portions. Then, the angle stopper 510 can allow the document convey unit DF to be opened at one desired open angle selected from two or more different open angles with respect to the glass surfaces.

What is claimed is:

1. An image forming apparatus comprising:
   an image reading unit having a slit glass plate for conveying and scanning a document and a platen glass plate for fixing and scanning the document;
   a document convey unit set above glass surfaces of the slit glass plate and platen glass plate;
   a display/operating portion provided to one side of the glass surface;
   a hinge provided to the other side of the glass plates serving to attach said document convey unit to be openable and closeable with respect to the glass surface; and
   a reversible angle stopper removably attached to said hinge, said angle stopper stopping said document convey unit at one desired open angle selected from at least two different open angles with respect to the glass surfaces.

2. An apparatus according to claim 1, wherein said angle stopper can change the open angle of said document convey unit with respect to the glass surfaces by reversing an attaching position at which the angle stopper is attached to said hinge.

* * * * *